(12) United States Patent
Burgunder et al.

(10) Patent No.: US 8,282,255 B2
(45) Date of Patent: Oct. 9, 2012

(54) WINDOW, IN PARTICULAR A WINDOW FOR AN AIRCRAFT CABIN

(75) Inventors: Samuel Burgunder, Toulouse (FR); Christophe Mialhe, Giroussens (FR)

(73) Assignee: Airbus Operations SAS, Toulouse (FR)

( * ) Notice: Subject to any disclaimer, the term of this patent is extended or adjusted under 35 U.S.C. 154(b) by 291 days.

(21) Appl. No.: 12/540,587

(22) Filed: Aug. 13, 2009

(65) Prior Publication Data
US 2010/0046235 A1  Feb. 25, 2010

(30) Foreign Application Priority Data
Aug. 25, 2008 (FR) .................... 08 04685

(51) Int. Cl.
*F21V 9/00* (2006.01)
*F21V 8/00* (2006.01)
(52) U.S. Cl. ................ 362/511; 362/470; 362/471
(58) Field of Classification Search .......... 362/470, 362/511, 576, 1, 2, 503, 471
See application file for complete search history.

(56) References Cited

U.S. PATENT DOCUMENTS

| 5,400,225 A * | 3/1995 | Currie ........................ 362/554 |
| 6,331,067 B1 * | 12/2001 | Enders ........................ 362/503 |
| 2006/0032980 A1 | 2/2006 | Jugovic et al. |
| 2006/0278352 A1 * | 12/2006 | Huang ..................... 160/370.21 |
| 2008/0166544 A1 | 7/2008 | Muller |
| 2008/0266887 A1 * | 10/2008 | Wentland et al. ............ 362/470 |

FOREIGN PATENT DOCUMENTS

| EP | 1 249 391 A2 | 10/2002 |
| EP | 1281613 A2 * | 2/2003 |
| FR | 2 911 111 | 7/2008 |

* cited by examiner

*Primary Examiner* — Robert May
(74) *Attorney, Agent, or Firm* — Oblon, Spivak, McClelland, Maier & Neustadt, L.L.P.

(57) ABSTRACT

A window intended to be assembled over an opening defined in an outside wall having on the one hand an outer partition and on the other hand an inner partition. This window includes a glazing, means making it possible to hold the glazing in the opening of the outside wall, while ensuring a watertightness at the outer partition, and a connection crosspiece between the outer partition and the inner partition. The crosspiece is implemented so as to make it possible to guide light having passed through the glazing toward the inner partition. Means making it possible to diffuse the light guided by the crosspiece are arranged at the inner partition.

12 Claims, 2 Drawing Sheets

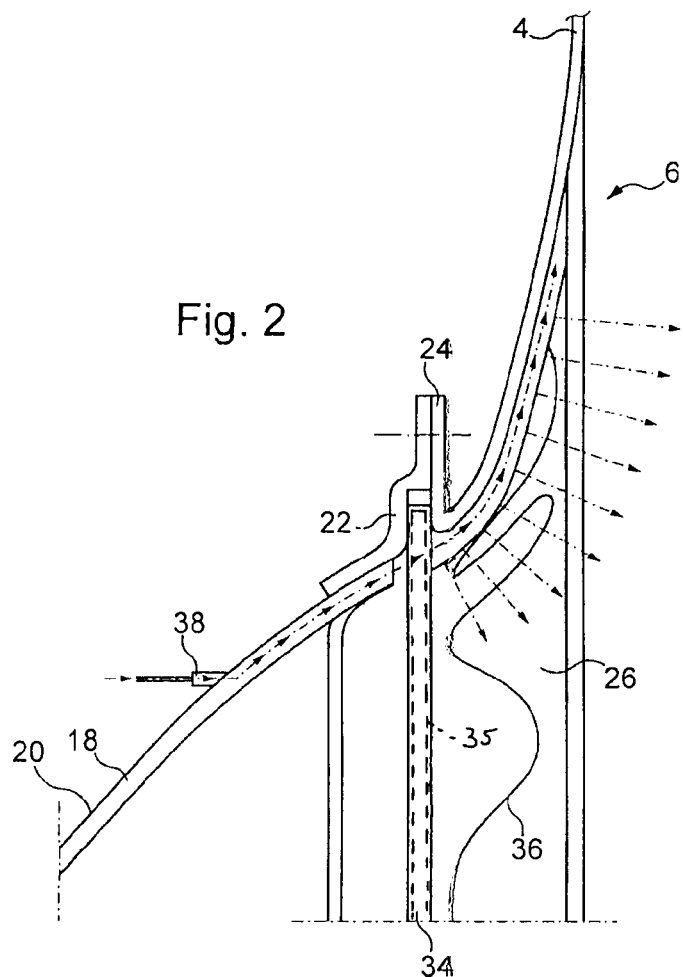
Fig. 2
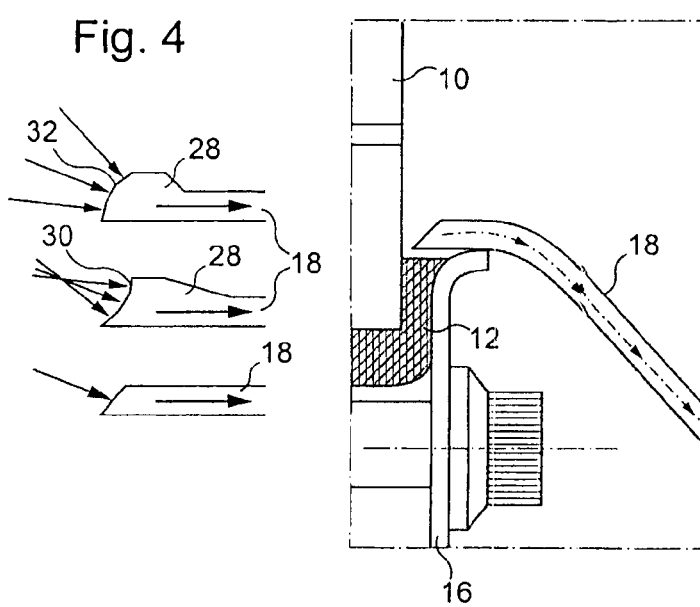
Fig. 4
Fig. 3

WINDOW, IN PARTICULAR A WINDOW FOR AN AIRCRAFT CABIN

This invention relates to a window, in particular a window for an aircraft cabin. It can apply in areas other than aeronautics with nevertheless similar constraints. The invention thus also will apply, for example, to the implementation of windows in boats, trains, or more generally vehicles.

A window for an aircraft is described, for example, in the documents FR-2 911 111, WO-2005/115841 and WO-2008/058746 of the prior art. These documents disclose a method for assembly of a window for an aircraft and/or a structure of an aircraft window.

In an aircraft cabin intended for the transport of passengers, the size of the windows generally is limited for technical reasons. In fact, physical increase in the size of the windows more often than not would generate a significant weight disadvantage. Furthermore, as explained, for example, in document WO-2007/031214, there also are constraints such as the pitch of the frameworks of the structure of the aircraft or else the need to run air ducts in the side walls of the cabin also accommodating the windows.

However, to enhance the comfort of the passengers, which is not limited to the quality of the seats or the reduction of noise, it is advisable also to improve the passengers' visual perception of the interior ambiance of the cabin of the aircraft. At present, this visual ambiance is handled through textures and colors used to implement the interior coverings, the seats, the various decorations, as well as the artificial lighting.

Thus for example, the document EP-1 492 701 proposes to enhance the comfort of the passengers, in particular at night, by proposing an artificial lighting at the frame of a window. A cylindrical tubular transition element made of translucent material is illuminated through its outer side. This tubular cylindrical transition element can form just a single part with the connecting cone intended for connection of the frame to the inner face of a window of the aircraft.

The idea at the origin of this invention is to improve the visual perception of an aircraft cabin by using to advantage the natural light present outside the cabin, which is one of the few links that the passengers retain with the outside world.

The source of natural light in an aircraft cabin is constituted essentially by the windows of the latter. As indicated above, for technical reasons, the windows are of reduced size and therefore limit the source of natural light toward the interior of the cabin. The link between the passengers and the world outside the airplane therefore is reduced.

Furthermore, according to the position of the aircraft, or more generally of the vehicle, in relation to the sun, it happens that the window is illuminated on the outside and that the light reaches the edge of the window assembly but without being used to advantage in order to illuminate the interior of the cabin of the vehicle. This occurs in particular when the angle of incidence of the light is relatively high or, in other words, when the rays of the sun form an acute, or even very acute, angle with the outside wall of the vehicle.

This invention then has as its purpose to provide means for enhancing the comfort of the passengers in an aircraft cabin by acting on the visual ambiance and by improving the link between the passengers and the outside world. Preferably, the corresponding additional cost incurred will be limited in comparison with a window of the prior art.

To this end, this invention proposes a window, in particular an aircraft window, intended to be assembled over an opening defined in an outside wall having on the one hand an outer partition and on the other hand an inner partition, the said window comprising a glazing, means making it possible to hold the glazing in the opening of the outside wall while ensuring a watertightness at the outer partition, and a connection crosspiece between the outer partition and the inner partition.

According to this invention, the crosspiece is implemented so as to make it possible to guide the light having passed through the glazing toward the inner partition, and means making it possible to diffuse the light guided by the crosspiece are arranged at the inner partition.

In this way it is possible to create, from the natural outside light, a luminous light-diffusing zone at the periphery of the window. In that way, the window is virtually enlarged and the passengers therefore perceive the cabin as being more luminous.

According to one preferred embodiment, the crosspiece is made of a transparent material, for example of methacrylate. Other embodiments can be considered so that the crosspiece will guide the light. It thus may comprise, for example, optical fibers that can be embedded in the crosspiece and/or arranged at the surface thereof.

More particularly, when the crosspiece is made of a material making it possible to conduct light, but not exclusively, the crosspiece advantageously is painted on its outer surface so as to promote the guiding of the light toward the means making it possible to diffuse the light.

In order to best capture the outside light, the crosspiece preferably is arranged directly next to the glazing. It can come directly in contact with the latter or else be spaced apart from the latter by a few tenths of a millimeter.

In order to improve the comfort of the passengers when they wish to be in darkness, a window according to the invention further can comprise an opaque curtain movable between a closed position in which it is situated between the crosspiece and the means making it possible to diffuse the light guided by the crosspiece, and an open position in which the light guided by the crosspiece can pass freely toward the means making it possible to diffuse the said light.

In an embodiment variant, a window according to the invention further can comprise lighting means and corresponding guiding means to lead the light emitted by the lighting means toward the crosspiece. In this way, artificial light becomes a complement to the natural light captured by the crosspiece in order to virtually enlarge the window. This artificial light also can be used at night to achieve luminous effects. In this embodiment variant, the lighting means advantageously are electroluminescent diodes. Such diodes are in fact known for their low electrical consumption, their low heating and their good lighting.

In a window according to this invention, the means making it possible to diffuse the light guided by the crosspiece comprise, for example, a diffusion screen with a flared shape made of a transparent material such as methacrylate. Such a diffusion screen has a low cost price and allows a good diffusion of the light.

A window according to this invention advantageously comprises means arranged facing the glazing and making it possible to capture the light having passed through the glazing. According to a first embodiment, these means for capturing the light comprise, for example, a beveled edge. According to another embodiment, these means for capturing the light can comprise an extra thickness of material inside the edge of the crosspiece situated on the glazing side.

For the purpose of best capturing the light coming from the outside of the vehicle (of the aircraft) and having passed through the glazing, the crosspiece preferably is adapted so that it extends radially in relation to the glazing in proximity thereto.

This invention also relates to an aircraft intended for the transport of passengers and comprising a cabin making it possible to accommodate passengers, characterized in that the said cabin has an outside wall equipped with windows such as described above.

Details and advantages of this invention will emerge more clearly from the description that follows, given with reference to the attached schematic drawings on which:

FIG. 2 is a detail view corresponding to box II of FIG. 1 and also illustrating an embodiment variant, FIG. 3 is a detail view corresponding to box III of FIG. 1, and FIG. 4 illustrates various possible forms for the light-capturing zone shown in greater detail on FIG. 3.

Figure 1:
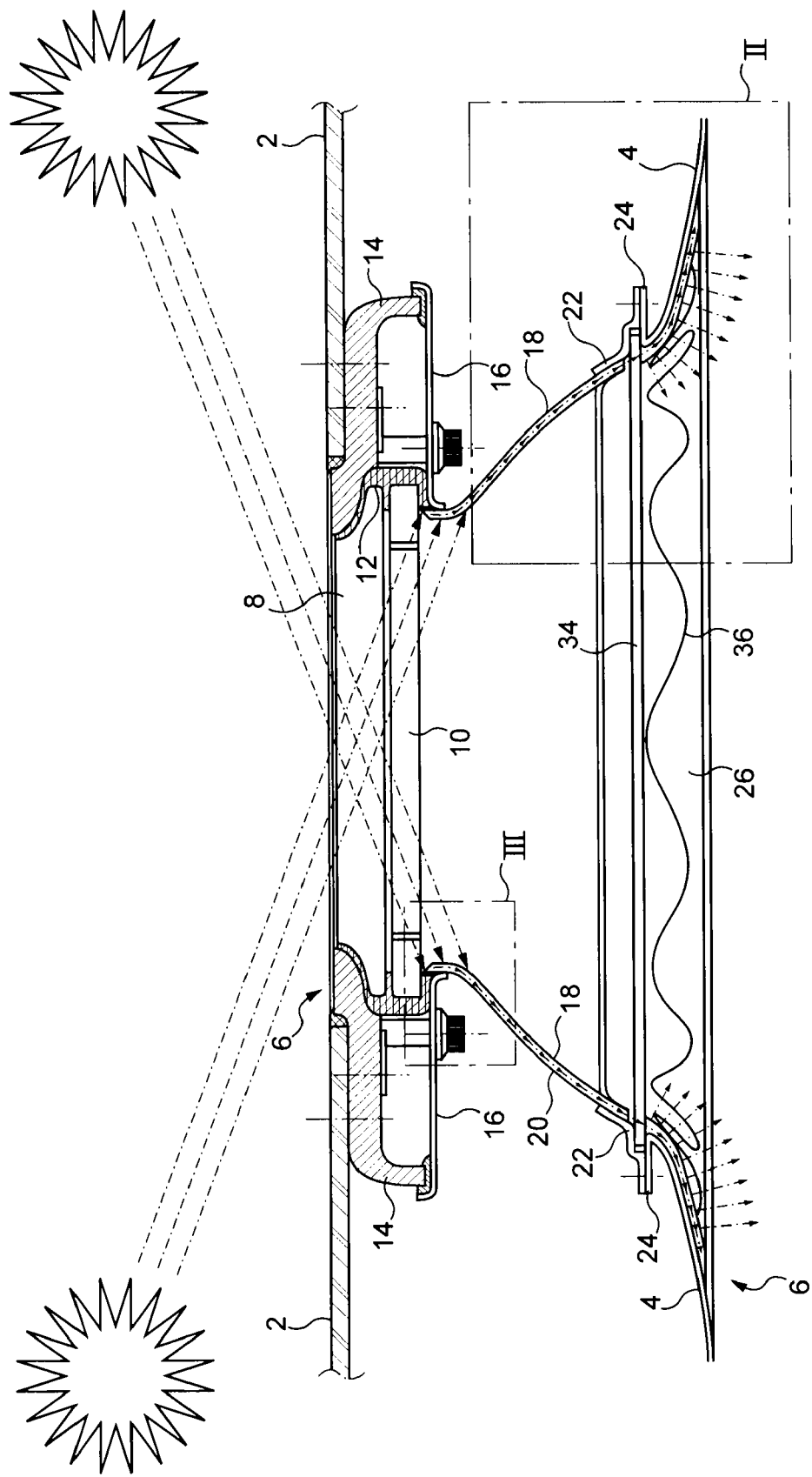
FIG. 1 is a view in cross section of a window according to the invention.

FIG. 1 illustrates an aircraft window assembled in an outside wall of an aircraft cabin. In known manner, an aircraft cabin intended for the transport of passengers is equipped with windows allowing the natural outside light to come into the cabin of the aircraft and the passengers to see outside the aircraft. Although the description that follows is given with reference to an aircraft, this invention can apply to other vehicles, for example trains, boats, etc.

The outside wall of an aircraft cabin usually comprises an outer partition 2 and an inner partition 4. Between these two partitions there are situated on the one hand structural elements-frameworks, etc. and on the other hand various conduits-electric cables, air conduits, etc. which are not shown on the attached drawings. The outer partition 2 corresponds to the fuselage partition visible from the exterior of the aircraft, while the inner partition 4 is the cabin partition visible from the interior of the cabin. This inner partition 4 accommodates the interior commercial assembly of the cabin.

The window shown is assembled in an opening 6 implemented in the entire thickness of the outside wall. This opening 6 is found again in the outer partition 2 as well as in the inner partition 4 with, however, different dimensions in these two partitions.

Opening 6 is closed off in watertight manner by a double glazing comprising an outer pane 8 and an inner pane 10. These two panes are assembled in a frame 12 arranged inside a window fitting 14. The whole formed by the frame 12 and the fitting 14 is screwed with a cover 16 and seals onto outer partition 2.

The assembly of such a glazing is not described in greater detail here because on the one hand it already is known to the individual skilled in the art and on the other hand it does not form part of this invention. Other known or future assemblies also can be used in the context of this invention.

The window shown also comprises a crosspiece 18 that is used to implement the connection between the outer partition 2 and the inner partition 4 and thus to close at the opening 6 the space existing between these two partitions. In innovative manner, this crosspiece 18 is used here to guide the light passing through the glazing toward the interior of the cabin.

The crosspiece 18 has a flared tubular shape that keeps widening from the outside toward the inside. This crosspiece 18 extends from the back of the glazing, that is, from the inner face of the inner pane 10 toward the interior of the cabin. As shown on the drawings (cf. in particular FIG. 3), the crosspiece 18 is arranged in direct proximity to the inner pane 10 without touching it, however. There can be contact between the inner pane 10 (or more generally the glazing), but a space on the order of a few tenths of a millimeter or at most a few millimeters also can remain between these elements. The cover 16 is used here with the frame 12 for the positioning and holding of the crosspiece 18 in relation to the glazing.

In order to guide the light, the crosspiece 18 is made of a transparent material such as methacrylate, for example. In order to prevent any loss of light toward the space situated between the outer partition 2 and the inner partition 4, the outer face 20 of the crosspiece 18 is covered by a coat of paint, preferably opaque, or even a reflective coat. The inner face, opposite the outer face 20, also can be treated (varnish, surface condition, opaque or translucent paint, . . . ) in order to prevent the light captured by the edge of the crosspiece 18 situated near the glazing from going back out of the crosspiece 18.

As an embodiment variant (not shown), it can be provided that optical fibers are embedded in the crosspiece 18 to conduct the light from the glazing toward the interior of the cabin.

The crosspiece 18 is held by a flange 22 that is fastened, for example by screwing, onto the inner partition 4. As can be seen on FIGS. 1 and 2, the inner partition 4, at the periphery of the opening 6 implemented in the outside wall of the cabin, is, for example, curved toward the outer partition 2 and has a rim 24 folded toward the interior of the space situated between the outer partition 2 and the inner partition 4. The flange 22 is, for example, screwed onto the rim 24 as shown on the drawings. On the outer partition 4 side, the crosspiece 18 can be held by the frame 12 and/or by the cover 16 coming to be inserted inside this (or these).

A diffusion screen 26 makes it possible to diffuse the light that was guided by the crosspiece 18 toward the interior of the cabin. It is made, for example, of the same material as the crosspiece, 18, that is, of methacrylate, for example. This diffusion screen 26 comes to extend the crosspiece 18. It has, itself, a flared tubular shape. In the preferred embodiment shown on the drawings, this diffusion screen 26 comes to follow the curbed shape of the inner partition 4 at the opening 6 and becomes flush with this inner partition 4. Fastening of this diffusion screen 26 is accomplished, for example, by gluing onto the inner partition 4.

By virtue of such a window, the visual ambiance of the interior of an aircraft cabin can be modified by giving the passengers the impression of having windows larger than they are in reality.

FIGS. 3 and 4 illustrate how the light coming from the outside is captured by the crosspiece 18 then to be guided toward the diffusion screen 26 and then to be diffused in the cabin of the aircraft.

It is seen, in particular on FIG. 3, that the crosspiece 18, near the glazing, extends perpendicular in relation to the glazing. On FIG. 3, a mixed line shows more or less the center line of the crosspiece 18, and the arrows on this mixed line schematically illustrate the path followed by the light in the crosspiece 18, Of course, reflections of the light can occur on the faces of the crosspiece 18. It is seen that at its end situated near the glazing, the center line of the crosspiece 18 is more or less perpendicular to the glazing.

The edge of the crosspiece 18, on the glazing side, can be, for example, merely beveled as shown, for example, on FIGS. 1 and 3. The edge of the crosspiece 18 then has a frustoconical shape flared toward the outside.

In a first embodiment variant, it is provided to implement an extra thickness of material inside the edge of the crosspiece situated on the glazing side, thus forming a peripheral weather strip 28 inside the crosspiece 18. This weather strip 28 can have several forms. By way of example, two embodiments are shown in FIG. 4. According to a first embodiment, the weather strip 28 displays a concave surface 30 facing the glazing through which the light enters. According to another embodiment, the weather strip 28 displays a convex surface 32 facing the glazing.

The light captured at the edge of the crosspiece 18, on the glazing side, then is guided by the crosspiece 18, as illustrated by the arrows on the Figures of the drawing, to the diffusion screen 26.

In the preferred embodiment shown on the attached drawings, a space 34 separates the crosspiece 18 from the diffusion screen 26. This space 34 is used to advantage to allow the passage of an opaque screen or curtain 35, when a passenger near the window wishes to have less light. Such opaque screens are known to the individual skilled in the art because they already are provided in many aircraft cabins intended for the transport of passengers.

In embodiment variants, it is contemplated, by way of non-limitative examples, either to eliminate the opaque mechanical curtain (or screen), or to replace it with an electronic curtain, that is, a liquid crystal layer deposited on the glazing, for example the inner pane 8, which can become opaque on simple command.

The diffusion screen 26 also can be used to produce visual effects. A wave-shaped line 36 thus is shown on the diffusion screen (FIGS. 1 and 2) in order to schematize the separation between a granular zone and a smooth zone of the diffusion screen. Various motifs can be considered here: thus, for example, there can be provided on the diffusion screen a logo of the airline company operating the aircraft, or else information concerning the row and/or the seats corresponding to the window, . . . .

FIG. 2 also illustrates an embodiment variant of this invention. In this variant, it is provided to equip the window with electroluminescent diodes, known under the name of LEDs 38. These LEDs 38 can be arranged, for example, so as to form a circlet around the crosspiece 18. The light from these LEDs 38 then is directed toward the crosspiece 18 which then guides it toward the diffusion screen 26. When the window is equipped with an opaque mechanical curtain or screen, the LEDs 38 preferably are situated upstream from this curtain (or screen). If the window is equipped with an electronic curtain, it can be provided, for example, that the "closing" of this electronic curtain also brings about the extinguishing of the corresponding diodes.

This invention makes it possible to set up the immediate environment of a window, providing a more gradual transition between the window glazing and the surrounding inner partition. This is achieved by capturing a portion of the natural light and redistributing it diffusely inside the cabin. In this way, the visual comfort of the passengers is improved. A window such as described above thus is virtually enlarged. Its connection with the rest of the cabin no longer displays an abrupt boundary and becomes a gradual or even changing transition zone with the variations in relative aspect between the window and the sun.

Although the additional provision of light is relatively small, the space inside the cabin is perceived as being more luminous. In fact, since the luminous flux is better controlled and distributed over a greater surface, it is the luminous surface that will contribute to producing this effect.

The proposed solution, apart from the variant making use of LEDs—or other light sources—uses only natural light and is entirely passive, but all the same makes it possible, by adjusting the capture of the light and by acting on the redistribution of the light, to "play" with the light, achieving different light effects.

The additional cost of the window according to the invention is limited in comparison with a window of the prior art because the structure of the window is only slightly modified.

This invention is not limited to the embodiment and the variants thereof described above by way of non-limitative examples. It also relates to the embodiment variants within the capacity of the individual skilled in the art in the context of the claims below.

The invention claimed is:

1. An aircraft window, located over an opening defined in an outside wall having an outer partition and an inner partition, the window comprising:
   a glazing;
   a holder configured to hold the glazing in the opening of the outside wall, while ensuring a watertightness at the outer partition;
   a connection crosspiece between the outer partition and the inner partition, and the glazing is located completely between the outer partition and the inner partition,
   wherein the crosspiece is made of a transparent material and is configured to guide light having passed through the glazing to the inner partition, and the crosspiece extends radially in relation to the glazing near the glazing; and
   a means for diffusing the light guided by the crosspiece are arranged at the inner partition.

2. The window according to claim 1, wherein the crosspiece is made of methacrylate.

3. The window according to claim 1, wherein the crosspiece is painted on its outer surface.

4. The window according to claim 1, wherein the crosspiece is arranged directly next to the glazing.

5. The window according to claim 1, further comprising an opaque curtain movable between a closed position in which the curtain is situated between the crosspiece and the means for diffusing the light guided by the crosspiece and an open position in which the light guided by the crosspiece can pass freely toward the means for diffusing the light.

6. The window according to claim 1, further comprising a lighting unit and corresponding guiding unit to lead the light emitted by the lighting unit toward the crosspiece.

7. The window according to claim 6, wherein the lighting unit includes electroluminescent diodes.

8. The window according to claim 1, wherein the means for diffusing the light guided by the crosspiece includes a diffusion screen with a flared shape made of a transparent material such as methacrylate.

9. The window according to claim 1, further comprising means for capturing light arranged facing the glazing and making it possible to capture light having passed through the glazing.

10. The window according to claim 9, wherein the means for capturing the light includes a beveled edge.

11. The window according to claim 9, wherein the means for capturing the light includes an extra thickness of material inside an edge of the crosspiece situated on the glazing side.

12. An aircraft intended for the transport of passengers and comprising a cabin making it possible to accommodate passengers, wherein said cabin has an outside wall equipped with windows according to claims 1 or 2-11.

* * * * *